(12) United States Patent
Hallberg

(10) Patent No.: US 11,915,840 B2
(45) Date of Patent: Feb. 27, 2024

(54) CABLE

(71) Applicant: Ningbo Geely Automobile Research & Development Co., Ltd., Ningbo (CN)

(72) Inventor: Linus Hallberg, Säve (SE)

(73) Assignee: NINGBO GEELY AUTOMOBILE RESEARCH & DEV. CO., LTD., Ningbo (CN)

( * ) Notice: Subject to any disclaimer, the term of this patent is extended or adjusted under 35 U.S.C. 154(b) by 884 days.

(21) Appl. No.: 16/940,023

(22) Filed: Jul. 27, 2020

(65) Prior Publication Data

US 2020/0357540 A1    Nov. 12, 2020

Related U.S. Application Data

(63) Continuation of application No. PCT/CN2019/074873, filed on Feb. 12, 2019.

(30) Foreign Application Priority Data

Feb. 28, 2018 (EP) ..................... 18159156

(51) Int. Cl.
*H01B 13/00* (2006.01)
*B60L 3/04* (2006.01)
(Continued)

(52) U.S. Cl.
CPC ............ *H01B 13/0009* (2013.01); *B60L 3/04* (2013.01); *B60R 16/0207* (2013.01);
(Continued)

(58) Field of Classification Search
CPC .... H01B 7/009; H01B 7/328; H01B 13/0009; H01B 13/18; B60K 28/14;
(Continued)

(56) References Cited

U.S. PATENT DOCUMENTS 5,781,990 A * 7/1998 Seidler .................. H01R 43/28
81/9.51
2006/0121773 A1* 6/2006 Ichikawa ........... H01R 13/5216
439/408
(Continued)

FOREIGN PATENT DOCUMENTS

CN          201060691 Y       5/2008
CN          201345378 Y       11/2009
(Continued)

OTHER PUBLICATIONS

International Search Report from corresponding International Application No. PCT/CN2019/074873, dated May 8, 2019, 2 pages.
(Continued)

*Primary Examiner* — Steven T Sawyer
(74) *Attorney, Agent, or Firm* — Tucker Ellis LLP

(57) ABSTRACT

A cable includes a first conductor and a first conductor isolation, wherein the first conductor includes at least a first break point between the first and second end of the cable and the first conductor isolation includes at least a second break point between the first and second end of the cable, the cable is configured so that the first conductor breaks at the at least first break point if the cable is exposed to a force that is above a first predetermined limit and first conductor isolation breaks at the at least second break point if the cable is exposed to a force that is above a second predetermined limit for avoiding hazardous electric shock after a crash of the vehicle.

13 Claims, 3 Drawing Sheets

(51) Int. Cl.
  *H01B 13/18* (2006.01)
  *H01R 4/70* (2006.01)
  *B60R 16/02* (2006.01)
  *B60L 3/00* (2019.01)

(52) U.S. Cl.
  CPC .............. *H01B 13/18* (2013.01); *H01R 4/70* (2013.01); *B60L 3/0007* (2013.01)

(58) Field of Classification Search
  CPC ... B60K 2028/006; B60L 3/04; B60L 3/0007; B60R 16/0207; H01R 4/70
  See application file for complete search history.

(56) References Cited

U.S. PATENT DOCUMENTS

2013/0153292 A1\* 6/2013 Adachi ................. H01B 7/009
  174/70 R
2015/0050833 A1 2/2015 Mizutani et al.

FOREIGN PATENT DOCUMENTS

| | | |
|---|---|---|
| CN | 103269895 A | 8/2013 |
| CN | 104376908 A | 2/2015 |
| CN | 104425906 A | 3/2015 |
| DE | 4321007 A1 | 1/1995 |
| DE | 10354855 A1 | 6/2004 |
| DE | 102014004948 A1 | 11/2014 |
| JP | S4978783 U | 7/1974 |
| JP | 5237810 Y | 8/1977 |
| JP | 5297174 A | 8/1977 |
| JP | 545780 U | 1/1979 |
| JP | 2000082371 A | 3/2000 |
| WO | 2015187841 A1 | 12/2015 |

OTHER PUBLICATIONS

European Search Report from corresponding European Application No. 18159156, dated Aug. 29, 2018, 2 pages.

\* cited by examiner

CABLE

RELATED APPLICATION DATA

This application is a continuation of International Patent Application No. PCT/CN2019/074873, filed Feb. 12, 2019, which claims the benefit of European Patent Application No. 18159156.1, filed Feb. 28, 2018, the disclosures of which are incorporated herein by reference in their entireties.

TECHNICAL FIELD

The disclosure pertains to the field of cables for distribution of electric energy and safety arrangements for such cables for avoiding hazardous electric shock.

BACKGROUND

Since the introduction of electricity in the society, cables have been used for distribution of electric energy. Some cables have a conductor that is isolated by air, like over-head cables, but for most cables the conductor is isolated by a conductor isolation, often a dielectric material, to e.g. prevent shortcircuit and fire, and for avoiding hazardous electric shock if touched by a human or animal. The electification of the society is continuing and more and more devices becomes electrified. Electric devices used by humans need to be safe to operate and also need to be safe when there is a failure in the operation of the device, to avoid hazardous electric shock by the human using the electric device. Example of electric devices used by humans are electric tools, household appliance, toys, home electric devices, electric machines, electric vehicles, gardening tools, industry power cables, electric power distribution cables, etc. Electric cables sometimes gets torn and worn that can lead to damage of the isolation so that the conductor of the cable risk coming in contact with e.g. a human or another torn and worn conductor, that can lead to shortcircuit and fire, and to a hazardous electric shock for a human touching the conductor. In e.g. a vehicle a cable can get damaged in an accident of the vehicle.

SUMMARY

Today there is a demand for a more safe cables for distribution of electric energy even when the cable is exposed to exceptional circumstances or worn and torn. In for example a vehicle, a cables can get damaged in a crash of the vehicle, and the cable can then be dangerous for a human. There is a demand for a cable that is preventing human touch with the conductor and thereby avoiding hazardous electric shock, e.g. after a crash of the vehicle, but also in any other fields of application where a cable for distribution of electric energy is used close to a human.

It is becoming more and more common with electrical vehicles, in particular cars, trucks and buses, that have electrical motors for propulsion. Often in these types of vehicles a high voltage battery is supplying electric power to the electric motors via high voltage cables from the high voltage battery to the electric motors. According to an aspect the power is supplied to the electric motors in a cable with two conductors, one conductor supplying the plus pole and one conductor supplying the minus pole of the electric motor. High voltage cables in vehicles that are connected to batteries are therefore then often safer than e.g. home appliance electric lines, since you need to touch both the plus and the minus conductor of a high voltage system in such electrical vehicles in order to get an electric chock. However the problem with the cables being exposed to exceptional circumstances, such as a crash of the vehicle, or worn and torn, remains and in such situations the high voltage cable in the electrical vehicle will often become hazardous to a human.

An object of the present disclosure is to provide a cable which seek to mitigate, alleviate, or eliminate one or more of the above-identified deficiencies in the art and disadvantages singly or in any combination.

The disclosure proposes a cable for distribution of electric energy within a vehicle. The cable comprising a first conductor for distribution of the electric energy between a first and second end of the cable and a first conductor isolation electrically isolating the first conductor. The first conductor comprising at least a first break point between the first and second end of the cable comprising a weakening of the first conductor. The at least first break point being configured so that the first conductor breaks at the at least first break point if the cable is exposed to a force that is above a first predetermined limit for cutting the distribution of electric energy at the at least first break point. The first conductor isolation comprising at least a second break point between the first and second end of the cable comprising a weakening of the first conductor isolation. The at least second break point being configured so that the first conductor isolation breaks at the at least second break point if the cable is exposed to a force that is above a second predetermined limit for avoiding hazardous electric shock after a crash of the vehicle. An advantage with this cable is that it can be designed in a way so that it can be predicted where the cable should break, in particular where the first conductor and the first conductor isolation of the cable should break, when exposed to a force that is above a predetermined limit. According to an aspect the first predetermined limit is different from the second predetermined limit. According to an aspect first predetermined limit is the same as the second predetermined limit.

According to an aspect the at least first break point and the at least second break are displaced in relation to each other so that the at least first break point and the at least second break point are located at different positions between the first and second end of the cable for stimulating that the first conductor and the first conductor isolation breaks at different positions between the first and second end of the cable. An advantage with that the cable breaks at different positions is that the first conductor isolation more likely cover the first conductor so that the first conductor is not exposed for touching by a human or for shortcircuit with any other conductor or electric guide in the vicinity of the cable.

According to an aspect the cable further comprising a second conductor for distribution of the electric energy between the first and second end of the cable and a second conductor isolation electrically isolating the second conductor. The second conductor comprising at least a third break point between the first and second end of the cable comprising a weakening of the second conductor. The at least third break point being configured so that the at least second conductor breaks at the at least third break point if the cable is exposed to a force that is above a third predetermined limit for cutting the distribution of electric energy at the at least third break point. An advantage with this cable is that it can be designed in a way so that it can be predicted where the cable should break, in particular where the second conductor of the cable should break, when exposed to a force that is above a third predetermined limit.

According to an aspect the second conductor isolation comprising at least a fourth break point between the first and second end of the cable comprising a weakening of the second conductor isolation, the at least fourth break point being configured so that the at least fourth conductor isolation breaks at the at least fourth break if the cable is exposed to a force that is above a fourth predetermined limit. An advantage with this cable is that it can be designed in a way so that it can be predicted where the cable should break, in particular where the second conductor isolation of the cable should break, when exposed to a force that is above a fourth predetermined limit.

According to an aspect the first, second, third and fourth predetermined limits are all different predetermined limits. According to an aspect the first, second, third and fourth predetermined limit are all the same predetermined limit. According to an aspect the first and the third predetermined limits are the same predetermined limit that is different from the second and/or fourth predetermined limit.

According to an aspect the at least first break point, the at least second break point, the at least third break point and the at least fourth break point are located at different positions between the first and second end of the cable for stimulating that the first conductor, the first conductor isolation, the second conductor and the second conductor isolation breaks at different positions between the first and second end of the cable. An advantage with that the cable breaks at different positions is that the first conductor isolation more likely cover the first conductor and the second conductor isolation more likely cover the second conductor so that the first conductor and the second conductor are not exposed for touching by a human or for short-circuiting with each other or any other electric guide in the vicinity of the cable.

According to an aspect the at least first break point and/or the at least third break point is defined by a smaller section surface of the conductor at the least first break point and/or the at least third break point in relation to the section surface of the conductor outside of the at least first break point and/or the at least third break point. This means that the conductor more easily breaks where the conductor has a smaller section surface since the conductor is stronger outside of the smaller section surface.

According to an aspect the at least first break point and/or the at least third break is defined by a weakening in the material structure of the conductor at the least first break point and/or the at least third break point in relation to the material structure of the conductor outside of the at least first break point and/or the at least third break point. In other words, the conductor more easily breaks where the conductor has a weakening in the material structure since the conductor is stronger where there is no weakening in the material.

According to an aspect the at least second break point and the at least fourth break point are displaced in relation to each other so that the at least second break point and the at least fourth break point are located at different positions between the first and second end of the cable for stimulating that the first conductor isolation and the second conductor isolation breaks at different positions between the first and second end of the cable. An advantage with that the break points of the first conductor isolation and the second conductor isolation are displaces is that this limits the risk that the first conductor and the second conductor shortcircuit or that a human touches the first conductor and the second conductor at the same time, which makes the cable more safe for avoiding hazardous electric shook.

According to an aspect the conductor is cut off at the at least first break point and/or the at least third break point and each section of the conductor on each side of the cut off is held together by the circumambient conductor isolation at the at least first break and/or the at least third break point. In other words, the conductor is divided into segments and when the cable is exposed to a force that is above a predetermined limit the circumambient conductor isolation, the cable may break which results in that the conductor separates where it is cut off.

According to an aspect the at least first break point and/or the at least third break point comprise a joint of the conductor, where the conductor is twined, taped, glued or soldered so that the joint is weaker than the conductor if the cable is exposed to a force that is above a predetermined limit. An advantage with this is that the conductor is well defined where to break, and it can be defined how weak the joint should be.

According to an aspect the cable further comprising a sheath surrounding the conductor and the conductor isolation for stimulating a break of the conductor and/or the conductor isolation inside of the sheath. In other words, the sheath may be more elastic than the conductor isolation and so that the conductor isolation breaks before the sheath.

According to an aspect the conductor and/or the conductor isolation comprising plural first break points, plural second break points, plural third break points or plural fourth break points. In other words, the cable can be designed to have plural breakpoints between the first and second end of the cable to ensure that the cable can break at any point.

According to an aspect the plural first break points and the plural second break points are located at predefined distances in relation to each other and the first cable comprising more first break points than second break points for stimulating a break of the first conductor inside the first conductor isolation. An advantage with more first break points than second break points is that it is more likely that the first conductor breaks inside the first conductor isolation so that the first conductor is not exposed for touching by a human or for shortcircuit with any other conductor or electric guide in the vicinity of the cable.

The disclosure further proposes a vehicle comprising a vehicle battery, an electrical component and the cable according to any aspects of the disclosure. The cable is a high voltage cable for distribution of electric energy between the vehicle battery to the electrical component, wherein the cable is adapted for breaking for preventing human touch with the conductor and thereby avoiding hazardous electric shock after a crash of the vehicle. An advantage with such vehicle is that it is more safe for humans that are in and around the vehicle, in the event the vehicle is crashed with the result of having the cable torn apart, since the cable is preventing human touch with the conductor and thereby avoiding hazardous electric shock.

BRIEF DESCRIPTION OF THE DRAWINGS

The foregoing will be apparent from the following more particular description of the example aspects, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1A:
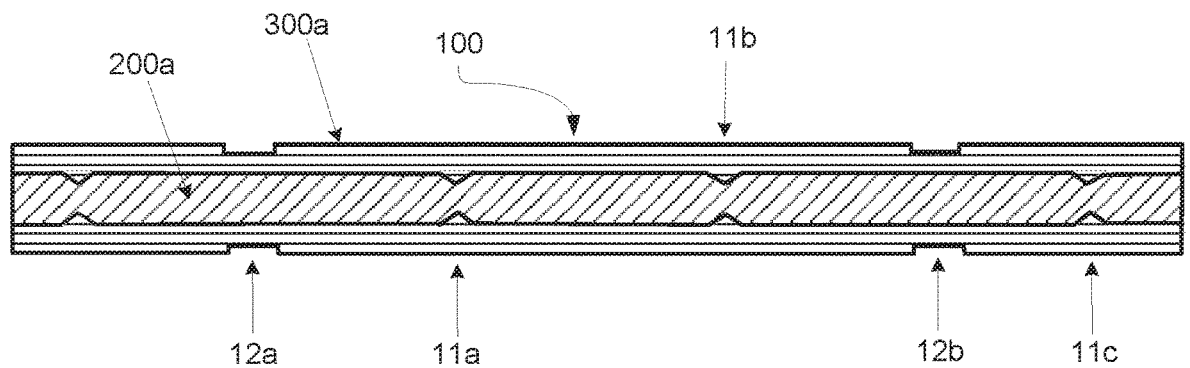
FIG. 1A illustrates an exemplary cable with a first conductor comprising at least a first break point, and a first conductor isolation comprising at least a second break point according to an aspect of the disclosure.

Aspects of the present disclosure will be described more fully hereinafter with reference to the accompanying drawings. The method and device disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

The electification of the society is continuing and more and more devices becomes electrified. Electric devices used by humans need to be safe to operate and also need to be safe when there is a failure in the operation of the device, to avoid hazardous electric shock by the human using the electric device. Example of electric devices used by humans are electric tools, household appliance, toys, home electric devices, electric machines, electric vehicles, gardening tools, industry power cables, electric power distribution cables, etc. Electric cables sometimes gets torn and worn that can lead to damage of the isolation so that the conductor of the cable risk coming in contact with e.g. a human or another torn and worn conductor, that can lead to shortcircuit and fire, and to a hazardous electric shock for a human touching the conductor. In e.g. a vehicle a cable can get damaged in an accident of the vehicle.

The inventor has identified that there is a need for a solution where a cable is designed for preventing a human to touch the conductor and thereby avoiding hazardous electric shock, e.g. after a crash of a vehicle, but also in any other fields of application where a cable for distribution of electric energy is used close to a human.

An object of the present disclosure is to provide a cable which seek to mitigate, alleviate, or eliminate one or more of the above-identified deficiencies in the art and disadvantages singly or in any combination.

A cable according to prior art traditionally has a conductor and a conductor isolation and the cross section of the cable is the same everywhere between the first and second end of the cable. If the cable according to prior art is exposed to a force that is above a predetermined limit the cable will break but it cannot be predicted where the cable will break, in particular where the conductor will break and/or where the conductor isolation will break.

The disclosure proposes a cable 100 for distribution of electric energy within a vehicle. The cable 100 comprising a first conductor 200a for distribution of the electric energy between a first and second end of the cable 100 and a first conductor isolation 300a electrically isolating the first conductor 200a. According to an aspect, the conductor is typically made of an electrically conducting material, often a metal such as copper or aluminum. According to an aspect, the conductor comprising a number of thinner wires that are twined together. According to an aspect the conductor isolation is typically made of an electrically isolating material, often plastics, such as polyvinyl chloride or cross-linked polyethylene. The first conductor 200a comprising at least a first break point 11a, 11b, 11c . . . , 11n between the first and second end of the cable 100 comprising a weakening of the first conductor 200a.

The at least first break point 11a, 11b, 11c . . . , 11n being configured so that the first conductor 200a breaks at the at least first break point 11a, 11b, 11c . . . , 11n if the cable 100 is exposed to a force that is above a first predetermined limit for cutting the distribution of electric energy at the at least first break point 11a, 11b, 11c . . . , 11n. The cable may be exposed to any of, or a combination of, a tensile, a traction and/or a torque force. Any cable can be cable exposed to exceptional circumstances or worn and torn in normal usage. In the example when a cable is used in a vehicle, the force may arise from e.g. a deformation of the vehicle chassis due to an accident of the vehicle. The force may also arise when the rescue service is e.g. opening or moving a crashed vehicle.

The first conductor isolation 300a comprising at least a second break point 12a, 12b, 12c, . . . , 12n between the first and second end of the cable 100 comprising a weakening of the first conductor isolation 300a. FIG. 1A illustrates an exemplary cable with a first conductor comprising at least a first break point, and a first conductor isolation comprising at least a second break point according to an aspect of the disclosure.

The at least second break point 12a, 12b, 12c . . . , 12n being configured so that the first conductor isolation 300a breaks at the at least second break point 12a, 12b, 12c . . . , 12n if the cable 100 is exposed to a force that is above a second predetermined limit for avoiding hazardous electric shock after a crash of the vehicle. An advantage with this cable 100 is that it can be designed in a way so that it can be predicted where the cable 100 should break, in particular where the first conductor 200a and the first conductor isolation 300a of the cable 100 should break, when exposed to a force that is above a predetermined limit.

According to an aspect the first predetermined limit is different from the second predetermined limit. According to an aspect first predetermined limit is the same as the second predetermined limit.

Figure 4:
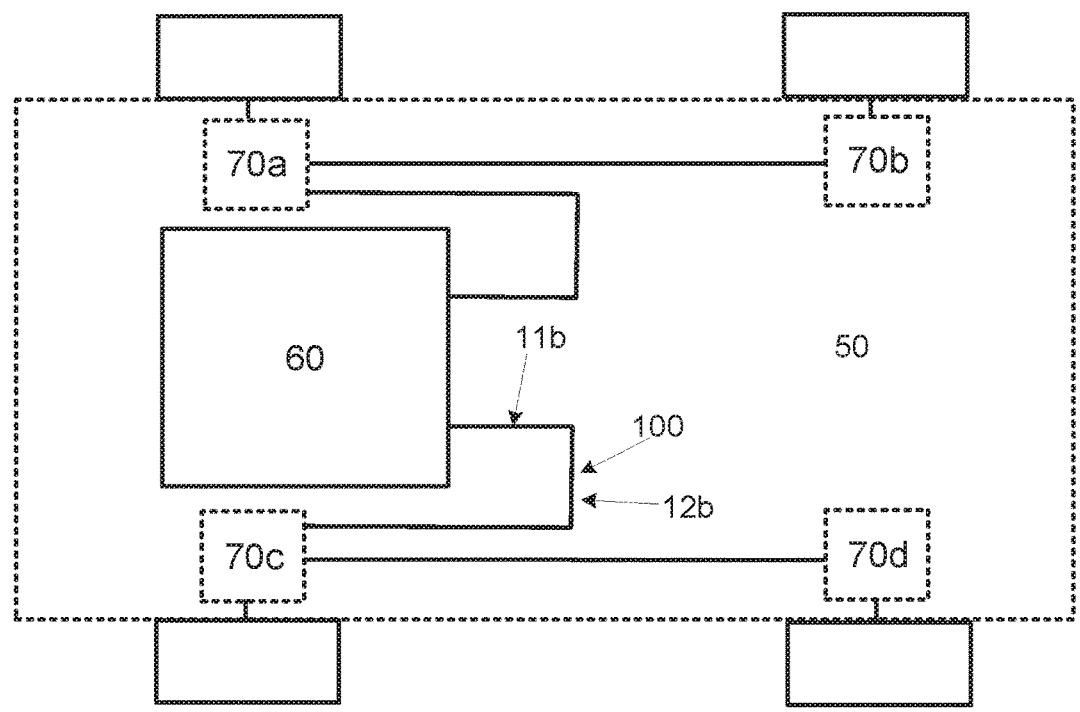
FIG. 4 illustrates an exemplary vehicle comprising a vehicle battery, an electrical component and a cable according to any aspects of the disclosure.

The inventor has realized that if the conductor stays inside of the isolation when the cable is broken, then this prevents a human to get in contact with the conductor. According to an aspect the at least first break point 11a, 11b, 11c . . . , 11n and the at least second break point 12a, 12b, 12c . . . , 12n are displaced in relation to each other so that the at least first break point 11a, 11b, 11c . . . , 11n and the at least second break point 12a, 12b, 12c . . . , 12n are located at different positions between the first and second end of the cable 100 for stimulating that the first conductor 200a and the first conductor isolation 300a breaks at different positions between the first and second end of the cable 100. According to an aspect, as illustrated in FIG. 4, the cable 100 has one first breakpoint 11b, of the first conductor 200a, that is at a first distance to the first end of the cable 100 adapted to be connected to a vehicle battery 60, and one second breakpoint 12b, of the first conductor isolation 300a, at a second distance to the first end of the cable 100 that is greater that the first distance, adapted so that the first predetermined limit is lower than the second predetermined limit when the cable 100 is exposed to a force, for causing the first conductor 200a to break before the first conductor isolation 300a breaks and thereby ensuring that the first conductor 200a stays inside of the first conductor isolation 300a when it breaks.

Figure 1B:
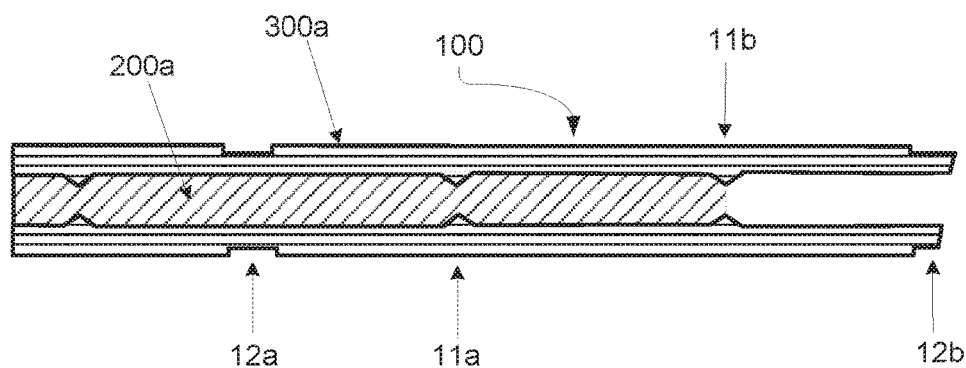
FIG. 1B illustrates an exemplary broken cable with a broken first conductor, and a broken first conductor isolation according to an aspect of the disclosure.
Figure 2:
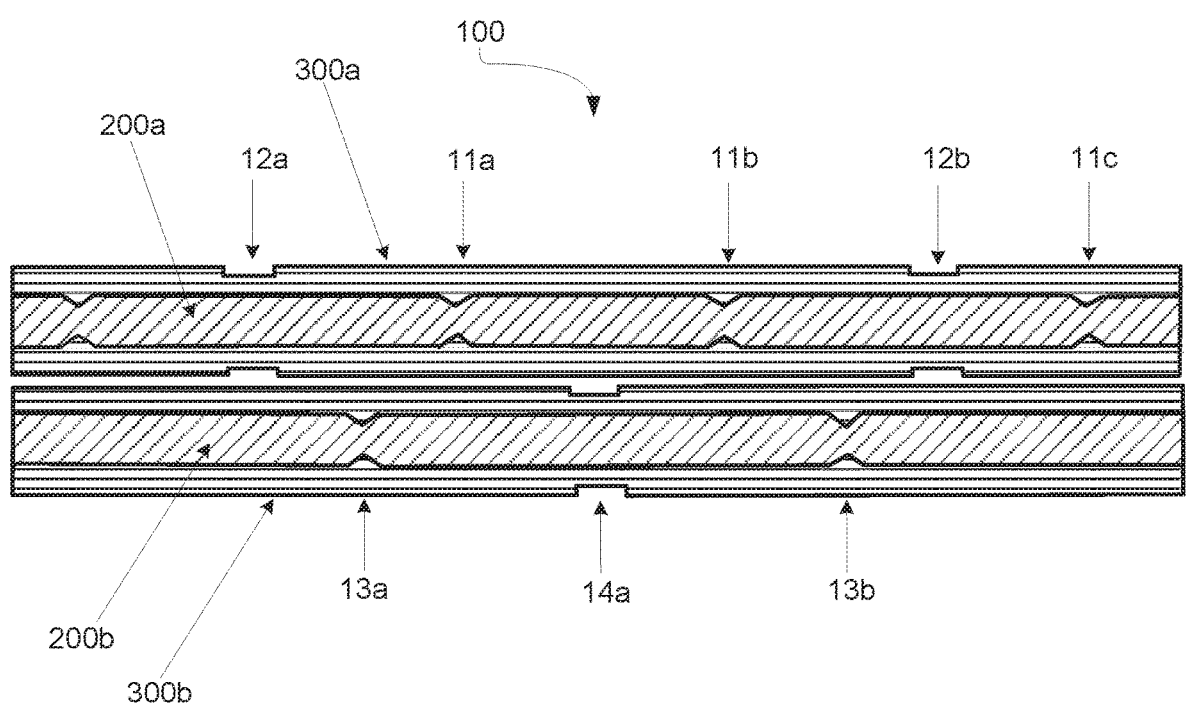
FIG. 2 illustrates an exemplary cable with two conductors where the at least first break point, the at least second break point, the at least third break point and the at least fourth break point are located at different positions between the first and second end of the cable.

FIG. 1B illustrates an exemplary broken cable with a broken first conductor 200a, and a broken first conductor isolation 300a according to an aspect of the disclosure. In particular FIG. 1B illustrates that since the at least first break point 11a, 11b, 11c . . . , 11n and the at least second break point 12a, 12b, 12c . . . , 12n are displaced in relation to each other, the cable is broken so that the first conductor 200a stays inside the first conductor isolation 300a. This prevents a human to get in contact with the first conductor 200a e.g. by touching by a finger or any contact with the skin of the human. An advantage with that the cable 100 breaks at different positions is hence that the first conductor isolation 300a more likely cover the first conductor 200a so that the first conductor 200a is not exposed for touching by a human or for shortcircuit with any other conductor or electric guide in the vicinity of the cable 100. This not only prevents a human from avoiding hazardous electric shock but also to prevent fire or sparks that can lead to fire due to a shortcircuit.

According to an aspect the cable 100 further comprising a second conductor 200b for distribution of the electric energy between the first and second end of the cable 100 and a second conductor isolation 300b electrically isolating the second conductor 300b.

The second conductor 200b comprising at least a third break point 13a, 13b, 13c . . . , 13n between the first and second end of the cable 100 comprising a weakening of the second conductor 200b. The at least third break point 13a, 13b, 13c . . . , 13n being configured so that the at least second conductor 200b breaks at the at least third break point 13a, 13b, 13c . . . , 13n if the cable 100 is exposed to a force that is above a third predetermined limit for cutting the distribution of electric energy at the at least third break point 13a, 13b, 13c . . . , 13n. An advantage with this cable 100 is that it can be designed in a way so that it can be predicted where the cable 100 should break, in particular where the second conductor 200b of the cable 100 should break, when exposed to a force that is above a third predetermined limit.

According to an aspect the second conductor isolation 300b comprising at least a fourth break point 14a, 14b, 14c, . . . , 14n between the first and second end of the cable 100 comprising a weakening of the second conductor isolation 300b, the at least fourth break point 14a, 14b, 14c . . . , 14n being configured so that the at least fourth conductor isolation 300a breaks at the at least fourth break point 14a, 14b, 14c . . . , 14n if the cable 100 is exposed to a force that is above a fourth predetermined limit. An advantage with this cable 100 is that it can be designed in a way so that it can be predicted where the cable 100 should break, in particular where the second conductor isolation 300b of the cable 100 should break, when exposed to a force that is above a fourth predetermined limit.

According to an aspect the at least first break point 11a, 11b, 11c . . . , 11n, the at least second break point 12a, 12b, 12c . . . , 12n, the at least third break point 13a, 13b, 13c . . . , 13n and the at least fourth break point 14a, 14b, 14c . . . , 14n are located at different positions between the first and second end of the cable 100 for stimulating that the first conductor 200a, the first conductor isolation 300a, the second conductor 200b and the second conductor isolation 300b breaks at different positions between the first and second end of the cable 100.

An advantage with that the cable 100 breaks at different positions is that the first conductor isolation 300a more likely cover the first conductor 200a and the second conductor isolation 300b more likely cover the second conductor 200b so that the first conductor 200a and the second conductor 200b are not exposed for touching by a human or for short-circuiting with each other or any other electric guide in the vicinity of the cable 100. This is of particular relevance in electric vehicles where a cable with two conductors is often used to e.g. supply the electric motors with energy from the high voltage battery. In such cable one conductor is supplying the plus pole and the other conductor is supplying the minus pole of the electric motor. If such cable is damaged e.g. due to a car crash, the two conductors should not come in contact with each other, to avoid short-circuiting, or be exposed for touch by a human, since this could lead to a hazardous shock.

Figure 3:
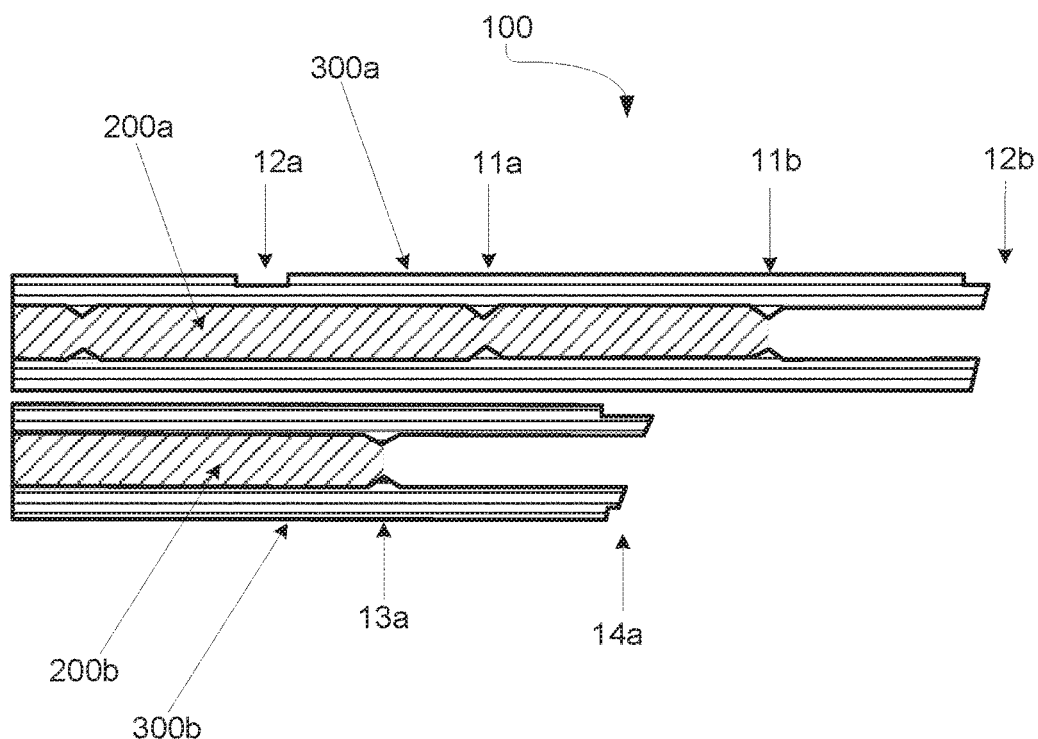
FIG. 3 illustrates an exemplary cable where the first conductor, the first conductor isolation the second conductor and the second conductor isolation are broken at different positions.

FIG. 3 illustrates an exemplary cable where the first conductor 200a, the first conductor isolation 300a, the second conductor 200b and the second conductor isolation 300b are broken at different positions. In the illustration of FIG. 3 the first conductor 200a is broken at the least first break point 11b, the first conductor isolation 300a is broken at the at least second break point 12b, the second conductor 200b is broken at the at least third break point 13a and the second conductor isolation 300b is broken at the at least fourth break point 14a. The first conductor 200a is enclosed by the first conductor isolation 300a and the second conductor 200b is enclosed by the second conductor isolation 300b. In this way the first and the second conductors avoids getting in contact with each other, which limits the risks for short-circuiting with each other and the exposure for touching by a human.

According to an aspect the at least first break point 11a, 11b, 11c . . . , 11n and/or the at least third break point 13a, 13b, 13c . . . , 13n is defined by a smaller section surface of the conductor 200a, 200b at the at least first break point 11a, 11b, 11c . . . , 11n and/or the at least third break point 13a, 13b, 13c . . . , 13n in relation to the section surface of the conductor 200a, 200b outside of the at least first break point 11a, 11b, 11c . . . , 11n and/or the at least third break point 13a, 13b, 13c . . . , 13n. This means that the conductor more easily breaks where the conductor has a smaller section surface since the conductor is stronger outside of the location of smaller section surface. In particular the conductor is less durable for a tensile force of the cable at the break points with smaller section surface.

According to an aspect the at least first break point 11a, 11b, 11c . . . , 11n and/or the at least third break point 13a, 13b, 13c . . . , 13n is defined by a weakening in the material structure of the conductor 200a, 200b at the least first break point 11a, 11b, 11c . . . , 11n and/or the at least third break point 13a, 13b, 13c . . . , 13n in relation to the material structure of the conductor 200a, 200b outside of the at least first break point 11a, 11b, 11c . . . , 11n and/or the at least third break point 13a, 13b, 13c . . . , 13n.

In other words, the conductor more easily breaks where the conductor has a weakening in the material structure since the conductor is stronger where there is no weakening in the material structure. According to an aspect the weakening in the material structure comprising a section for a porous material. According to an aspect the weakening in the material structure is caused by e.g. a flattening of the conductor so that the conductor is less durable for a shearing force. According to an aspect the weakening in the material structure comprising a blend of other metals in a section of the conductor.

According to an aspect the at least second break point 12a, 12b, 12c . . . , 12n and the at least fourth break point 14a, 14b, 14c . . . , 14n are displaced in relation to each other so that the at least second break point 12a, 12b, 12c . . . , 12n and the at least fourth break point 14a, 14b, 14c . . . , 14n are located at different positions between the first and second end of the cable 100 for stimulating that the first conductor isolation 300a and the second conductor isolation 300b breaks at different positions between the first and second end of the cable 100. An advantage with that the break points of the first conductor isolation 300a and the second conductor isolation 300b are displaced is that this limits the risk that the first conductor 200a and the second conductor 200b short-circuit or that a human touches the first conductor 200a and the second conductor 200b at the same time, which makes the cable 100 more safe for avoiding hazardous electric shook.

According to an aspect the conductor 200a, 200b is cut off at the at least first break point 11a, 11b, 11c . . . , 11n and/or the at least third break point 13a, 13b, 13c . . . , 13n and each section of the conductor 200a, 200b on each side of the cut off is held together by the circumambient conductor isolation 300a, 300b at the at least first break point 11a, 11b, 11c . . . , 11n and/or the at least third break point 13a, 13b, 13c . . . , 13n. In other words, the conductor is divided into segments and when the cable 100 is exposed to a force that is above a predetermined limit the circumambient conductor isolation 300a, 300b, the cable 100 may break which results in that the conductor separates where it is cut off.

According to an aspect the conductor is held together by being glued on to circumambient conductor isolation at predefined locations between the first and second end of the cable 100. According to an aspect the conductor is held together by being glued on to circumambient conductor isolation at predefined locations between the first and second end of the cable 100.

According to an aspect the at least first break point 11a, 11b, 11c . . . , 11n and/or the at least third break point 13a, 13b, 13c . . . , 13n comprise a joint of the conductor 200a, 200b, where the conductor 200a, 200b is twined, taped, glued or soldered so that the joint is weaker than the conductor 200a, 200b if the cable 100 is exposed to a force that is above a predetermined limit. An advantage with this is that the conductor is well defined where to break, and it can be defined how weak the joint should be. According to an aspect different glue with different strength can be used at predefined locations between the first and second end of the cable 100. According to an aspect two ends of the conductor is overlapped and taped together with a certain overlap to ensure that the electrical resistance is not higher in the joint compare to the conductor itself.

According to an aspect the cable 100 further comprising a sheath 400 surrounding the conductor 200a, 200b and the conductor isolation 300a, 300b for stimulating a break of the conductor 200a, 200b and/or the conductor isolation 300a, 300b inside of the sheath 400. In other words, the sheath may be more elastic than the conductor isolation 300a, 300b and so that the conductor isolation 300a, 300b breaks before the sheath. According to an aspect the sheath is made of an elastic rubber or plastic material such as polyurethane.

According to an aspect the conductor 200a, 200b and/or the conductor isolation 300a, 300b comprising plural first break points 11a, 11b, 11c . . . , 11n, plural second break points 12a, 12b, 12c . . . , 12n, plural third break points 13a, 13b, 13c . . . , 13n or plural fourth break points 14a, 14b, 14c . . . , 14n. In other words, the cable 100 can be designed to have plural breakpoints between the first and second end of the cable 100 to ensure that the cable 100 can break at any point. In other words, with breakpoints between the first and second end of the cable 100 the cable 100 can break at plural places, which is useful in environments where it is difficult to predict where the cable is likely to be damaged e.g. in a vehicle accident.

According to an aspect the plural first break points 11a, 11b, 11c . . . , 11n and the plural second break points 12a, 12b, 12c . . . , 12n are located at predefined distances in relation to each other and the first cable 100 comprising more first break points 11a, 11b, 11c . . . , 11n than second break points 12a, 12b, 12c . . . , 12n for stimulating a break of the first conductor 200a inside the first conductor isolation 300a. An advantage with more first break points 11a, 11b, 11c . . . , 11n than second break points 12a, 12b, 12c . . . , 12n is that it is more likely that the first conductor 200a breaks inside the first conductor isolation 300a so that the first conductor 200a is not exposed for touching by a human or for shortcircuit with any other conductor or electric guide in the vicinity of the cable 100.

The disclosure further proposes a vehicle 50 comprising a vehicle battery 60, an electrical component 70a, 70b, 70c, 70d and the cable 100 according to any aspects of the disclosure. The cable 100 is a high voltage cable for distribution of electric energy between the vehicle battery 60 to the electrical component 70a, 70b, 70c, 70d, wherein the cable 100 is adapted for breaking for preventing human touch with the conductor 200a, 200b and thereby avoiding hazardous electric shock after a crash of the vehicle.

An advantage with such vehicle is that it is more safe for humans that are in and around the vehicle, in the event the vehicle is crashed with the result of having the cable torn apart, since the cable is preventing human touch with the conductor and thereby avoiding hazardous electric shock.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A cable for distribution of electric energy within a vehicle, the cable comprising:
   a first conductor for distribution of the electric energy between a first end and a second end of the cable;
   a first conductor isolation electrically isolating the first conductor;
   wherein the first conductor comprising at least a first break point between the first and second ends of the cable comprising a weakening of the first conductor, the at least first break point being configured so that the first conductor breaks at the at least first break point if the cable is exposed to a force that is above a first predetermined limit for cutting the distribution of electric energy at the at least first break point;
   the first conductor isolation comprising at least a second break point between the first and second ends of the cable comprising a weakening of the first conductor isolation, the at least second break point being configured so that the first conductor isolation breaks at the at least second break point if the cable is exposed to a force that is above a second predetermined limit for avoiding hazardous electric shock after a crash of the vehicle; and
   wherein the at least first break point and the at least second break point are displaced in relation to each other so that the at least first break point and the at least second break point are located at different positions between the first and second ends of the cable for stimulating that the first conductor and the first conductor isolation break at different positions between the first and second ends of the cable.

2. The cable according to claim 1, the cable further comprising:
   a second conductor for distribution of the electric energy between the first and second ends of the cable;
   a second conductor isolation electrically isolating the second conductor;
   wherein the second conductor comprising at least a third break point between the first and second ends of the cable comprising a weakening of the second conductor, the at least third break point being configured so that the at least second conductor breaks at the at least third break point if the cable is exposed to a force that is above a third predetermined limit for cutting the distribution of electric energy at the at least third break point.

3. The cable according to claim 2, wherein the second conductor isolation comprising at least a fourth break point between the first and second ends of the cable comprising a weakening of the second conductor isolation, the at least fourth break point being configured so that the at least fourth conductor isolation breaks at the at least fourth break point if the cable is exposed to a force that is above a fourth predetermined limit.

4. A cable for distribution of electric energy within a vehicle, the cable comprising:
   a first conductor for distribution of the electric energy between a first end and a second end of the cable;
   a first conductor isolation electrically isolating the first conductor;
   wherein the first conductor comprising at least a first break point between the first and second ends of the cable comprising a weakening of the first conductor, the at least first break point being configured so that the first conductor breaks at the at least first break point if the cable is exposed to a force that is above a first predetermined limit for cutting the distribution of electric energy at the at least first break point;
   the first conductor isolation comprising at least a second break point between the first and second ends of the cable comprising a weakening of the first conductor isolation, the at least second break point being configured so that the first conductor isolation breaks at the at least second break point if the cable is exposed to a force that is above a second predetermined limit for avoiding hazardous electric shock after a crash of the vehicle;
   wherein the cable further comprising:
   a second conductor for distribution of the electric energy between the first and second ends of the cable;
   a second conductor isolation electrically isolating the second conductor;
   wherein the second conductor comprising at least a third break point between the first and second ends of the cable comprising a weakening of the second conductor, the at least third break point being configured so that the at least second conductor breaks at the at least third break point if the cable is exposed to a force that is above a third predetermined limit for cutting the distribution of electric energy at the at least third break point;
   wherein the second conductor isolation comprising at least a fourth break point between the first and second ends of the cable comprising a weakening of the second conductor isolation, the at least fourth break point being configured so that the at least fourth conductor isolation breaks at the at least fourth break point if the cable is exposed to a force that is above a fourth predetermined limit; and
   wherein the at least first break point, the at least second break point, the at least third break point and the at least fourth break point are located at different positions between the first and second ends of the cable for stimulating that the first conductor, the first conductor isolation, the second conductor and the second conductor isolation break at different positions between the first and second ends of the cable.

5. The cable according to claim 2, wherein the at least first break point and/or the at least third break point is defined by a smaller section surface of the conductor at the least first break point and/or the at least third break point in relation to the section surface of the conductor outside of the at least first break point and/or the at least third break point.

6. The cable according to claim 2, wherein the at least first break point and/or the at least third break point is defined by a weakening in the material structure of the conductor at the least first break point and/or the at least third break point in relation to the material structure of the conductor outside of the at least first break point and/or the at least third break point.

7. A cable for distribution of electric energy within a vehicle, the cable comprising:
   a first conductor for distribution of the electric energy between a first end and a second end of the cable;
   a first conductor isolation electrically isolating the first conductor;
   wherein the first conductor comprising at least a first break point between the first and second ends of the cable comprising a weakening of the first conductor, the at least first break point being configured so that the first conductor breaks at the at least first break point if the cable is exposed to a force that is above a first predetermined limit for cutting the distribution of electric energy at the at least first break point;

the first conductor isolation comprising at least a second break point between the first and second ends of the cable comprising a weakening of the first conductor isolation, the at least second break point being configured so that the first conductor isolation breaks at the at least second break point if the cable is exposed to a force that is above a second predetermined limit for avoiding hazardous electric shock after a crash of the vehicle;

wherein the cable further comprising:

a second conductor for distribution of the electric energy between the first and second ends of the cable;

a second conductor isolation electrically isolating the second conductor;

wherein the second conductor comprising at least a third break point between the first and second ends of the cable comprising a weakening of the second conductor, the at least third break point being configured so that the at least second conductor breaks at the at least third break point if the cable is exposed to a force that is above a third predetermined limit for cutting the distribution of electric energy at the at least third break point;

wherein the second conductor isolation comprising at least a fourth break point between the first and second ends of the cable comprising a weakening of the second conductor isolation, the at least fourth break point being configured so that the at least fourth conductor isolation breaks at the at least fourth break point if the cable is exposed to a force that is above a fourth predetermined limit; and wherein the at least second break point and the at least fourth break point are displaced in relation to each other so that the at least second break point and the at least fourth break point are located at different positions between the first and second ends of the cable for stimulating that the first conductor isolation and the second conductor isolation break at different positions between the first and second ends of the cable.

8. The cable according to claim 2, wherein the conductor is cut off at the at least first break point and/or the at least third break point and each section of the conductor on each side of the cut off is held together by a circumambient conductor isolation at the at least first break point and/or the at least third break point.

9. The cable according to claim 2, wherein the at least first break point and/or the at least third break point comprise a joint of the conductor, where the conductor is twined, taped, glued or soldered so that the joint is weaker than the conductor if the cable is exposed to a force that is above a predetermined limit.

10. The cable according to claim 1, wherein the cable further comprising a sheath surrounding the conductor and the conductor isolation for stimulating a break of the conductor and/or the conductor isolation inside of the sheath.

11. The cable according to claim 3, wherein the conductor and/or the conductor isolation comprising plural first break points, plural second break points, plural third break points or plural fourth break points.

12. The cable according to claim 11, wherein the plural first break points and the plural second break points are located at predefined distances in relation to each other and the cable comprising more first break points than second break points for stimulating a break of the first conductor inside the first conductor isolation.

13. A vehicle comprising
a vehicle battery;
an electrical component;
and the cable according to claim 1,
wherein the cable is a high voltage cable for distribution of electric energy between the vehicle battery to the electrical component, wherein the cable is adapted for breaking for preventing human touch with the conductor and thereby avoiding hazardous electric shock after a crash of the vehicle.

* * * * *